3,050,510
POLYMERIZATION OF ARYL OLEFINS
Peter J. Canterino and Boris Franzus, Bartlesville, Okla., assignors to Phillips Petroleum Company, a corporation of Delaware
No Drawing. Filed Dec. 23, 1957, Ser. No. 704,255
8 Claims. (Cl. 260—93.5)

This invention relates to the polymerization of aryl olefins. In one aspect, it relates to an improved method for polymerizing aryl olefins to high molecular weight polymers.

Various methods are described in the literature for preparing styrene polymers. It has also been recently discovered that aryl olefins can be polymerized in the presence of certain organometallic type catalysts utilizing a hydrocarbon diluent. For example, in the copending U.S. patent application of H. D. Lyons and Gene Nowlin, Serial No. 589,376, filed June 5, 1956, it is disclosed that styrene and other aryl olefins can be polymerized in the presence of a catalyst system comprising an organometal and a halide of a Group IV–B metal. The instant invention is an improvement in organometal catalyzed processes for polymerizing aryl olefins.

It is an object of this invention to provide an improved process for polymerizing aryl olefins.

Another object of the invention is to provide a process for polymerizing aryl olefins in which the reaction takes place at a very rapid rate.

Other and further objects and advantages of the invention will become apparent to those skilled in the art upon consideration of the accompanying disclosure.

The present invention resides in the discovery that aryl olefins can be polymerized to high molecular weight polymers at a very rapid reaction rate by a process which comprises contacting an aryl olefin, such as styrene, with a catalyst comprising at least two essential components, one of the components being a metal compound selected from the group consisting of Group IV, Group V and Group VI metal compounds, and another of the components being selected from the group consisting of organometal compounds, metal hydrides, and metals of Groups I, II and III, the aforementioned contacting occurring in the presence of a diluent selected from the group consisting of carbon tetrachloride and tetrachloroethane. By utilizing a halogenated hydrocarbon diluent rather than a non-halogen containing hydrocarbon diluent, it is possible to obtain a very rapid reaction rate which renders the process advantageous for use in commercial operations.

The catalyst system used in the practice of this invention includes at least two components. One component is an organometal compound, including those where one or more organo radicals is replaced by a halogen; a metal hydride; or a metal of Groups I, II or III, while the second component is a Group IV, V, VI, or VIII (Mendeléeff's Periodic System) metal compound, e.g., a salt or an alcoholate. The organometal compounds referred to include, without limitations, alkyl, cycloalkyl, or aryl compounds of the Group I, II or III metals, particularly aluminum, gallium, indium, thallium, beryllium, sodium, potassium, lithium, rubidium, cesium, magnesium, cadmium, mercury, zinc, barium, and lead, and tin, or such organometal compounds where one or more but not all of the alkyl, cycloalkyl, or aryl groups is replaced by a hydrogen atom and/or a halogen atom. The organo groups can be quite large, compounds being applicable which have 15 or more carbon atoms in each alkyl, cycloalkyl or aryl group and 40 or more carbon atoms in the molecule. Specific examples of such organometal compounds include triethylaluminum, triisobutylaluminum, a mixture of diethylaluminum chloride and ethylaluminum dichloride, sometimes referred to as ethylaluminum sesquichloride, diethylaluminum hydride, ethylaluminum dichloride, or diethylaluminum chloride, taken alone, trioctylaluminum, tridodecylaluminum, triphenylaluminum, triphenylgallium, diphenylberyllium, dicyclohexylberyllium, cyclohexylzinc chloride, tetraphenyllead, tetraethyltin, and $Al(CH_3)_3$, $H_2AlCH_3$, $Be(CH_3)_2$, $Ga(C_3H_7)_3$, $In(CH_3)_3$, $Be(C_6H_5)_2$, $Al(C_6H_{13})_3$, $Ga(C_6H_5)_3$, $CH_3AlCl$ $(C_4H_9)_2AlBr$, $C_8H_{17}AlI_2$, $(C_3H_7)_2GaF$, $(C_6H_{11})_2GaCl$ (cyclohexane derivative), $C_6H_5GaBr_2$ $C_{20}H_{41}GaBr_2$ $(C_{14}H_{29})_2GaF$, $(C_6H_5)_2InCl$, $C_8H_{17}InF_2$, $C_6H_{11}InBr_2$ (cyclohexane derivative), $C_{17}H_{35}BeI$, $CH_3BeBr$, and the like.

The hydrides of Group I, II or III metals can include, as specific examples, aluminum hydride, lithium aluminum hydride, barium hydride, gallium hydride, indium hydride, sodium aluminum hydride, potassium beryllium hydride.

The metals of the first, second and third groups are applicable as a class, the most important members being sodium, magnesium and aluminum.

When one component of the catalyst system as a metal of Groups I, II or III, an organic halide is often include of in the system. The class of halides defined as monohalogen-substituted hydrocarbons having a maximum chain length of 8 carbon atoms are preferred. Examples of organic halides which can be used are ethyl bromide, propyl chloride, butyl iodide, pentyl fluoride, benzyl chloride, cyclopentyl chloride, and alkyl bromide.

The compounds of metals of Group IV to VI or VIII of the periodic system include the oxides, hydrides, halides, oxyhalides, alcoholates and salts of organic acids, usually having twenty or less carbon atoms, such as formic acid, of the Group IV to VI or VIII metals such as titanium, zirconium, chromium, thorium, molybdenum, vanadium, iridium, and platinum.

The alcoholates of a metal of Group IV of the periodic system which can be employed conform to the formula $X_nM(OR)_m$, where $m+n$ equals the valence of the metal M and $m$ is at least one, X is a halogen, and R is an organic radical usually having twenty or less carbon atoms, and preferably being an alkyl, cycloalkyl, aryl, chloroalkyl, chlorocycloalkyl or chloroaryl group. Specific examples of such alcoholates are titanium butoxide (tetra-n-butyl titanate), tetra-sec-butyl titanate, tetraisopropyl titanate, tetra-2-ethylbutyl titanate, tetra-2-ethylhexyl titanate, tetrastearyl titanate, tetraethyl titanate, tetra-(chloroethyl) titanate, tetra-m-tolyl titanate, tetraallyl titanate, tetracyclohexenyl titanate, tetracyclopentyl titanate, tetraethyl zirconate, tetramethyl zirconate, tetraisopropyl zirconate, tetraamyl zirconate, dichlorodiethyl titanate $(Cl_2Ti(OC_2H_5)_2)$, monochlorotriethyl titanate $$(ClTi(OC_2H_5)_3)$$

and dichloro diethyl zirconate $(Cl_2Zr(OC_2H_5)_2)$. Also included are such compounds as $Hf(OCH_3)_4$, $Th(OC_3H_7)_4$, $Th(OC_6H_5)_4$, $Cl_3Ti(OC_6H_4OH_3)$ $Zr(OC_4H_7)_4$, $Cl_2Hf(OC_{10}H_{21})_2$, $Th(OC_6H_{13})_4$, and $Zr(OC_{12}H_{25})_4$.

Examples of suitable catalyst systems in accordance with the foregoing disclosure are as follows:

(a) Aluminum trialkyls, e.g., triethylaluminum or triisobutylaluminum and the tetravalent metal halides of the type represented by titanium tetrachloride;

(b) An organic halide (such as ethyl bromide), an inorganic halide of a Group IV metal (such as titanium tetrachloride), and a low valence metal selected from the group consisting of alkali metals, beryllium, magnesium, zinc, cadmium, mercury, aluminum, gallium, indium, and thallium, for example, magnesium, ethyl bromide and titanium tetrachloride, as such, or with the addition of metallic aluminum;

(c) A Group IV metal halide, for example, titanium tetrachloride, and a low valence metal identified in (b), for example, sodium, aluminum or magnesium;

(d) A mixture of titanium hydride and an organometal compound exemplified by an aluminum alkyl halide, e.g., a mixture of titanium hydride and ethylaluminum sesquichloride;

(e) Titanium dioxide and an organometal compound such as trialkylaluminum and aluminum alkyl chlorides, e.g., a mixture of titanium dioxide and ethylaluminum sesquichloride;

(f) A mixture of molybdenum pentachloride and organometal compounds and halides exemplified by triethylaluminum and ethylaluminum dichloride;

(g) A mixture of complex metal halides, exemplified by potassium fluotitanate, and organometal compounds and halides exemplified by triethylaluminum and diethylaluminum chloride;

(h) A mixture of a derivative selected from the oxides of molybdenum, alkali metal and ammonium molybdates, and an organometal compound or halide exemplified by triisobutylaluminum and isobutylaluminum dichloride;

(i) A mixture of a derivative of iridium, platinum and osmium selected from the group consisting of halides, oxides and complex compounds of iridium, platinum and osmium, said complex compounds corresponding to the formula $M_xM'X_y$, wherein M is an alkali metal or an ammonium radical, M' is iridium, platinum or osmium, X is a halogen, and y is at least 1 and the sum of x and y is equal to the valence of M' and a metallic organic compound exemplified by triethylaluminum, for example, iridium chloride and triethylaluminum or ethylaluminum sesquichloride;

(j) At least one derivative selected from the group consisting of oxides, halides, and oxyhalides or vanadium and complex salts of the halides with a member selected from the group consisting of ammonium halide and an alkali metal halide, and an organometal compound exemplified by triethylaluminum, for example, vanadium oxide and triethylaluminum;

(k) A mixture of a derivative of a group VI metal selected from the group consisting of halides, oxyhalides, hydroxyhalides, oxyhydroxyhalides of a metal selected from the group consisting of molybdenum, tungsten, uranium, selenium, tellurium, and polonium, and complex salts of said halides and said oxyhalides with a member selected from the group consisting of halides of sodium, potassium, lithium, rubidium, cesium and ammonia and an organometal compound exemplified by triethylaluminum, for example, molybdenum pentachloride and ethylaluminum dichloride;

(l) A chromyl halide and at least one of the following (1) a metal hydride or an organometal compound, (2) an organometal halide, and (3) a mixture of an organic halide and a metal, for example, chromyl chloride, ethyl bromide and magnesium;

(m) At least one halide of titanium, zirconium or hafnium and at least one hydride of lithium, sodium, potassium, rubidium, cesium, magnesium, calcium, strontium, barium, lanthanum or thorium, for example zirconium tetrachloride and calcium hydride;

(n) (1) A hydrocarbon derivative of one of the metals, zinc, cadmium, mercury, and magnesium and (2) a member selected from the group consisting of halides of titanium, zirconium, vanadium, and molybdenum, oxyhalides of titanium, zirconium, vanadium, molybdenum and chromium, and complex salts of said halides and oxyhalides with a member selected from the group consisting of halides of the alkali metals and ammonia, for example, diethylzinc and titanium tetrachloride.

(o) (1) A hydrocarbon derivative of one of the metals tin or lead and a Group IV metal halide, for example tetraethyllead or tetraphenyltin and titanium tetrachloride.

The catalyst systems falling within the scope of this disclosure which are preferred are the following: a mixture of titanium tetrachloride and triisobutylaluminum; a mixture of titanium tetrachloride and triethylaluminum; a mixture of titanium tetrachloride, ethylaluminum dichloride and diethylaluminum chloride; a mixture of chromyl chloride and triethylaluminum; and a mixture of chromyl chloride, ethylaluminum dichloride and diethylaluminum chloride. The components of the catalyst systems are usually used in the anhydrous or substantially anhydrous condition.

The amount of the catalyst composition of this invention which is used in the polymerization of aryl olefins can vary over a wide range. Relatively small amounts of the catalyst provide the desired activating effect when the polymerization reaction is carried out as a batch process with continuous addition of the olefin as the polymerization reaction occurs. When a continuous flow system is employed, the concentration of the total catalyst composition is usually in the range from 0.01 to 1.0 weight percent, or higher.

The mol ratios of catalyst components to each other are generally within the range of 0.05 to 50. However, it is preferred to utilize a catalyst in which the ratio of the amounts of organo compound, metal hydride or free metal to the Group IV to VI or VIII metal compound is in the range of 2 to 5 mols.

The materials which are polymerized in accordance with the present invention can be broadly defined as aryl olefins. The term "aryl olefins" as used herein is intended to include styrene, derivatives of styrene, and other vinyl-substituted aromatic compounds. For example, derivatives of styrene containing non-interferring substituents in the ring, such as alkyl, alkoxy and halogen groups, can be polymerized in accordance with this invention. In general, the total number of carbon atoms in the monomers does not exceed 20. Examples of aryl olefins which can be employed in the instant process are styrene, alpha-methylstyrene, 3-methylstyrene, 2,3-dimethylstyrene, 2,4,6-trimethylstyrene, 3-ethylstyrene, 4-ethylstyrene, 4-dodecylstyrene, 3-decoxy 2,3,5-trichlorostyrene, 2-(1-chlorobutyl) styrene, and the like.

It is also within the scope of the invention to copolymerize aryl olefins with other unsaturated hydrocarbons. Examples of copolymerizable monomers include aliphatic 1-olefins, such as ethylene, propylene, 1-butene, 1-hexene, and 1-octene, and conjugated dienes such as 1,3-butadiene, isoprene, 2,3-dimethylbutadiene, 2-methoxybutadiene, 2-phenylbutadiene, and the like. When preparing copolymers of aryl olefins with other copolymerizable monomers, the aryl olefin is present in an amount comprising at least 80 weight percent of the monomers.

In carrying out the process of this invention, the reaction temperature generally falls within the range of −20° F. to 70° F. However, it is preferred to operate in a temperature range of zero to 50° F. As will become apparent hereinafter from a consideration of the examples, the polymerization process of this invention provides a method for preparing polymers of aryl olefins at a much greater reaction rate than is possible when hydrocarbon diluents are utilized. Since the reaction rate of the polymerization is dependent upon temperature as are most chemical reactions, the particular temperature within the aforementioned ranges at which the process is carried out will depend upon the reaction time which is desired. Since with certain catalyst systems styrene polymerizes at temperatures above 70° F. with explosive violence, temperatures below 50° F. are usually employed. Although pressures ranging from zero up to 30,000 p.s.i.g. or higher can be used, a pressure in the range of atmospheric to 1000 p.s.i.g. is usually preferred.

As previously mentioned, the polymerization process of this invention is carried out in the presence of a halogen-containing diluent selected from the group consisting of carbon tetrachloride and tetrachloroethane. The amount of diluent usually employed is in the range of 0.5 to 20 volumes of diluent per volume of monomer.

The process of this invention can be carried out as a batch process by pressuring the aryl olefin into a reactor containing the catalyst and halogen-containing diluent. Furthermore, the process can be carried out continuously by maintaining the above-described concentrations of reactants in the reactor for a suitable residence time. In a continuous process, the residence time is generally less than 20 minutes, and batch reactions usually exhibit similar reaction times. It is to be understood that the residence time depends upon several factors, including the temperature at which the process is carried out, the amount of catalyst used, and the particular monomer being polymerized.

Various materials are known to inactivate the catalyst composition of this invention. These materials include carbon dioxide, oxygen and water. Therefore, it is usually desirable to free the monomers from these materials, as well as from other materials which tend to inactivate the catalyst, before contacting with the catalyst occurs. Any of the unknown means for removing such contaminants can be employed. The halogen-containing diluent used in the process should also be freed of contaminants, such as water, oxygen, and the like. It is desirable also that air and moisture be removed from the reaction vessel before the reaction is carried out.

At the completion of the polymerization reaction, when a batch process is used, the reactor is cooled to about room temperature, any excess olefin is vented, and the contents of the reactor, including the solid polymer swollen with diluent, is removed from the reactor. The total reactor effluent is then treated to inactivate the catalyst, as by washing with an alcohol. The alcohol-washing step is preferably carried out in a comminution zone, such as a Waring Blendor, so that a finely divided polymer is thereby provided. The polymer is then separated from the alcohol and diluent by decantation or filtration after which the polymer is dried. When the process of the invention is carried out continuously, the total effluent from the reactor, including polymer, diluent and catalyst system, is pumped from the reactor as a slurry to a catalyst-inactivating zone where the reactor effluent is cooled and contacted with a suitable catalyst-inactivating material, such as an alcohol. As in the batch process, it is desirable that the alcohol-treatment step be carried out in a comminution zone so that a finely divided polymer is thereby produced. Thereafter, the diluent and alcohol are separated from the polymer, for example, by filtration, and the polymer is then dried. The diluent and alcohol can be separated, for example by fractional distillation, and reused in the process.

A more comprehensive understanding of the invention may be obtained by referring to the following illustrative examples which are not intended, however, to be unduly limitative of the invention.

*Example I*

Styrene was polymerized to high molecular weight polymer according to the procedure described hereinbelow, employing carbon tetrachloride and cyclohexane as the diluents in two separate runs.

In the first run, 5 milliliters of an 0.805 molar solution of triisobutylaluminum in cyclohexane (0.796 gram), 0.2 milliliter of $TiCl_4$ (density of 1.726 grams/milliliter), and 50 milliliters of reagent grade carbon tetrachloride were charged to a flask while flushing with nitrogen. Styrene was charged to the flask dropwise, and instantaneous polymerization occurred at room temperature, the reaction being quite violent.

In the second run, the charge was identical to that of the first run, except that 50 milliliters of pure grade cyclohexane was employed instead of the carbon tetrachloride. Polymerization occurred, but the reaction was much slower than in the run in which carbon tetrachloride was employed.

The reaction mixture from each of the above runs was poured into an excess of isopropyl alcohol. Styrene polymer was recovered from each run.

*Example II*

Fifty milliliters of carbon tetrachloride was charged to a 125 milliliter Erlenmeyer flask, after which 5 milliliters of an 0.805 molar solution of triisobutylaluminum in cyclohexane (0.796 gram) and 0.2 milliliter of $TiCl_4$ (density of 1.726 grams/milliliter) were charged to the flask. Five milliliters (4.5 grams) of styrene was then dissolved in 50 milliliters of carbon tetrachloride, and the solution was then added to the flask. The flask was then placed in an ice water bath at 40° F. and maintained at this temperature for 1.5 hours. Thereafter, the reaction mixture was poured into an excess of isopropyl alcohol, and the polymer formed in the polymerization precipitated. After drying, 3.71 grams of dry polymer was recovered, representing a yield of 82.5 percent.

The above run was repeated, using cyclohexane instead of carbon tetrachloride. No polymer was formed in this run, in which the reaction mixture was maintained at 40° F.

*Example III*

A run was made in which the same charges of catalyst components were used as described in Example II. However, the catalyst components were introduced into a flask which contained 5 milliliters of cyclohexane. The catalyst complex which formed was then added to 60 milliliters of carbon tetrachloride, after which 5 milliliters (4.5 grams) of styrene was added to the mixture. The flask containing this mixture was then placed in an ice water bath for 1½ hours at 40° F. Thereafter, the polymer was precipitated by pouring the mixture into isopropyl alcohol. After drying, it was found that the yield of polymer was 3.53 grams, representing a yield of 78.5 percent.

The aryl olefin polymers which are prepared in accordance with the process of this invention are of high molecular weight and have a high melting point. For example, the styrene polymer prepared by the present process usually has a melting point in excess of 160° C. (320° F.). The polymers of the instant invention are particularly suitable for use in the fabrication of articles which may be subsequently subjected to high temperatures. In general, the polymers produced in accordance with this invention have utility in applications where solid plastics are used. They can be molded to form articles of many desired shapes, such as bottles and other containers for liquids, and they can be formed into pipe by extrusion.

As will be evident to those skilled in the art, many variations and modifications of the invention can be made in view of the foregoing disclosure. Such variations and modifications are believed to be clearly within the scope of the invention.

We claim:

1. A method for producing a solid polymer of an aryl-olefin of the group consisting of styrene and substituted styrenes containing up to and including 20 carbon atoms which comprises contacting said arylolefin with a catalyst comprising two components, one of said components being a metal compound selected from the group consisting of Groups IV, V, VI and VIII metal compounds, and the other of said components being selected from the group consisting of organo compounds of metals of Groups I, II and III, tin and lead, hydrides of metals of Groups I, II, and III, and metals of Groups I, II and III, the ratios of said components being in the range of 0.05 to 50 mols, said contacting occurring in a halogen-containing diluent consisting of carbon tetrachloride, the amount of said diluent being in the range of 0.5 to 20 volumes of diluent per volume of said arylolefin, at a temperature in the range of −20° F. to 70° F. and a pressure in the range of atmospheric to 1000 p.s.i.g.; and recovering the solid polymer so produced.

2. The method according to claim 1 wherein said catalyst consists essentially of titanium tetrachloride and triethylaluminum.

3. The method according to claim 1 wherein said catalyst consists essentially of titanium tetrachloride and triisobutylaluminum.

4. The method according to claim 1 wherein said catalyst consists essentially of titanium tetrachloride, ethylaluminum dichloride and diethylaluminum chloride.

5. The method according to claim 1 wherein said catalyst consists essentially of chromyl chloride and triisobutylaluminum.

6. The method according to claim 1 wherein said catalyst consists essentially of chromyl chloride, ethylaluminum dichloride and diethylaluminum chloride.

7. A method according to claim 1 wherein said olefin is styrene.

8. A method for producing a solid polymer of styrene which comprises contacting styrene with a catalyst consisting essentially of a mixture of from 2 to 5 mols of triisobutylaluminum per mol of titanium tetrachloride, in carbon tetrachloride and at a temperature in the range of zero to 50° F. and a pressure in the range of atmospheric to 1000 p.s.i.g., the amount of said carbon tetrachloride being in the range of 0.5 to 20 volumes per volume of styrene.

References Cited in the file of this patent

UNITED STATES PATENTS

| | | |
|---|---|---|
| 2,485,454 | Nelson et al. | Oct. 18, 1949 |
| 2,542,610 | Young | Feb. 20, 1951 |
| 2,768,147 | Meis et al. | Oct. 23, 1956 |
| 2,820,778 | Spaenig et al. | Jan. 21, 1958 |
| 2,827,447 | Nowlin et al. | Mar. 18, 1958 |
| 2,906,743 | Heitzer et al. | Sept. 29, 1959 |
| 2,910,461 | Nowlin et al. | Oct. 27, 1959 |
| 2,931,792 | Aries | Apr. 5, 1960 |

FOREIGN PATENTS

| | | |
|---|---|---|
| 538,782 | Belgium | Dec. 6, 1955 |